United States Patent
Offermann et al.

(10) Patent No.: US 8,451,100 B2
(45) Date of Patent: May 28, 2013

(54) USE OF A TRANSPONDER FOR SERVICING WORK ON AN INSTALLATION COMPONENT

(75) Inventors: Wolfgang Offermann, Essen (DE); Martin Stephan, Moers (DE)

(73) Assignee: STEAG Energy Services GmbH, Essen (DE)

( * ) Notice: Subject to any disclaimer, the term of this patent is extended or adjusted under 35 U.S.C. 154(b) by 380 days.

(21) Appl. No.: 12/578,156

(22) Filed: Oct. 13, 2009

(65) Prior Publication Data

US 2010/0090808 A1  Apr. 15, 2010

(30) Foreign Application Priority Data

Oct. 13, 2008 (EP) ..................................... 08166450

(51) Int. Cl.
*H04Q 5/22* (2006.01)
*G21C 7/36* (2006.01)
*G21C 17/00* (2006.01)

(52) U.S. Cl.
USPC ........................... 340/10.6; 376/217; 376/259

(58) Field of Classification Search
USPC ........ 340/10.1–10.6, 870.17, 870.18, 870.19, 340/825.54, 573, 572.1, 540, 539.22, 539.2; 376/217, 259
See application file for complete search history.

(56) References Cited

U.S. PATENT DOCUMENTS

| | | | | |
|---|---|---|---|---|
| 5,321,629 A * | 6/1994 | Shirata et al. | ................. | 702/187 |
| 5,745,049 A * | 4/1998 | Akiyama et al. | ......... | 340/870.17 |
| 6,417,760 B1 | 7/2002 | Mabuchi et al. | | |
| 6,753,830 B2 * | 6/2004 | Gelbman | ........................ | 345/55 |
| 6,859,757 B2 * | 2/2005 | Muehl et al. | ................... | 702/184 |
| 7,178,727 B2 | 2/2007 | Yoked et al. | | |
| 7,220,968 B2 * | 5/2007 | Burger et al. | ............ | 250/370.01 |
| 7,791,480 B2 * | 9/2010 | Skorpik et al. | ............. | 340/572.1 |
| 7,832,258 B2 * | 11/2010 | Mudge et al. | ..................... | 73/86 |
| 2001/0020935 A1 | 9/2001 | Gelbman | | |
| 2005/0218218 A1 | 10/2005 | Koster | | |
| 2006/0247803 A1 * | 11/2006 | Mori | ............................... | 700/80 |
| 2007/0247333 A1 | 10/2007 | Borean et al. | | |
| 2008/0157925 A1 | 7/2008 | Batra | | |
| 2010/0052909 A1 * | 3/2010 | Doan et al. | ................. | 340/572.1 |

FOREIGN PATENT DOCUMENTS

| | | |
|---|---|---|
| DE | 198 53 013 | 9/1999 |
| WO | 2006/012997 | 2/2006 |
| WO | 2009/021273 | 2/2009 |

\* cited by examiner

*Primary Examiner* — Daniel Wu
*Assistant Examiner* — Mancil Littlejohn
(74) *Attorney, Agent, or Firm* — Fay Kaplun & Marcin, LLP

(57) ABSTRACT

Described is the use of a transponder in a commercial installation, particularly a power plant, which allows problems and dangerous situations existing in this context to be avoided and the attainable occupational safety in a commercial installation, particularly a power plant, to be increased. The transponder includes a reception element, a transmission element, a visual display unit and a memory element and also a control element which is operatively connected to these, in a commercial installation, particularly a power plant, in an arrangement or positioning on or in proximity to a component or at a switching or measuring point associated with the component for the purpose of visually displaying an operating state for the component or the switching or measuring point associated therewith using the visual display unit of the transponder.

19 Claims, 3 Drawing Sheets

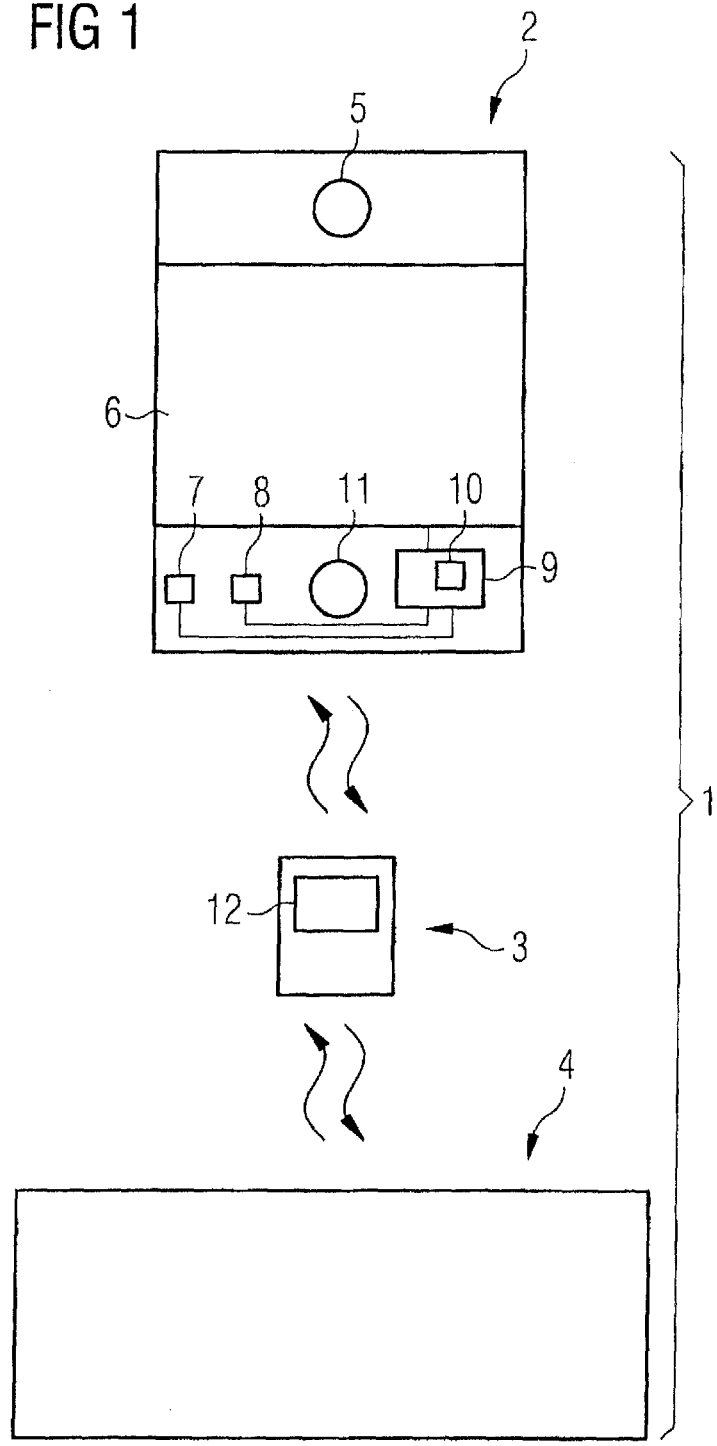

USE OF A TRANSPONDER FOR SERVICING WORK ON AN INSTALLATION COMPONENT

PRIORITY CLAIM

This application claims the benefit of the filing date of EP Application Serial No. 08 166 450 filed on Oct. 13, 2008, the disclosure of this application is hereby incorporated herein by reference.

FIELD OF INVENTION

The present invention relates to the use of a transponder in a commercial installation, particularly a power plant. In addition, the present invention relates to a method for performing maintenance, servicing and/or repair work on a component and/or on a switching or measuring point associated with said component in a commercial installation, particularly a power plant. Furthermore, the present invention relates to a commercial installation, particularly a power plant, which is equipped with a transponder that is used therein.

BACKGROUND INFORMATION

Transponders are radio communication appliances which are increasingly often used for identifying a wide variety of objects. In comparison with conventional bar code patterns, which are likewise used for identification, transponders have a greater storage capacity. Transponders are designed such that data can be transferred to and read from the transponder by radio. Transponders are now available from various manufacturers and can be used in a mixed mode with other appliances, since they are compatible on the basis of their standardization. During its manufacture, each individual transponder is usually provided with an explicit, invariable and readable identifier in the form of a transponder identification information unit, which means that no two transponders exist with the same transponder identification information unit. By attaching a transponder, it is therefore possible to explicitly identify any objects. Information stored on the transponder is stored invisibly to humans, however, and therefore cannot be read by the human eye.

On the basis of this, the use of transponders in power plants and many commercial installations in order to assist and simplify a wide variety of processes in maintenance work and maintenance measures is regarded with scepticism.

A large amount of the maintenance work and maintenance measures in commercial installations is accompanied by a process of what is known as disconnecting a component before the start of the work and measures and reconnecting the component when the work is concluded. Disconnection is generally understood to mean producing a state in which no voltage is present on electrical installations or components, and also comprises the possibly manual performance of switching actions on mechanical installations, such as the operation of manually operated valves. Particularly before the start of work for maintenance work and maintenance measures, it is necessary for the component to be disconnected without error—that is to say for the component to be effectively "switched off"—so that the safe performance of the work in situ, i.e. on the component, is assured. When the component is reconnected, it is necessary to ensure that work performed in parallel on this component has also been concluded altogether before the component is connected and hence restarted. This reconnection is also referred to as normalization of the component.

The process of disconnection has been assisted for a relatively long time by a computer-aided method which manages the planning and performance of disconnection operations on individual components and also entire procedural systems by creating disconnection lists with individual disconnection steps which are output on paper. Example activities for performing an individual disconnection step are the manual closure of a mechanical valve or the stopping of an electric motor with subsequent removal of the fuse in order to prevent inadvertent reconnection. The disconnection steps are performed using the disconnection plan in the commercial installation, are rendered visually recognizable in situ by attaching adhesive labels, signs, markers or the like and are confirmed as performed on the disconnection list by means of a signature. When all the disconnection steps associated with a component have been performed and this has been checked using the disconnection list, it is possible to give the go-ahead for performing maintenance work and maintenance measures on the relevant component while ensuring a safe work area. The maintenance work and maintenance measures themselves should likewise be performed and confirmed using a list. Only after checking whether all the work and measures to be performed have been concluded can the relevant component be reconnected. The component is reconnected (what is known as normalization) using the disconnection list which needs to be worked through. This also includes removing the attached adhesive labels, signs, markers or the like. This concludes the disconnection operation.

In commercial installations, however, it is not uncommon for several disconnection steps to be simultaneously active on one component of the installation and furthermore for disconnection steps in several active disconnection plans to relate to the same technical component. In this case, it is necessary to ensure that this individual component is disconnected for as long as just one of the simultaneously performed pieces of work is still in progress. Before the normalization is performed, it is therefore necessary to check whether one or more components quoted in the disconnection steps of one disconnection are also included in other active disconnection operations. Should this be the case then it is necessary to exclude this step from the normalization. This task is difficult and potentially susceptible to error, since each disconnection step needs to be checked against each disconnection step in all other active disconnection plans. Although the use of a computer-aided method of conflict recognition as addressed above increases the reliability of the check significantly, computer-aided disconnection does not stretch to the actual location of the disconnection, which means that human error can result in the disconnection of a component despite precise guidelines.

Furthermore, it is possible for the disconnection to be reversed for an incorrect component because an annotation or marker indicating the disconnection is not present on the component, is illegible or is inaccurate. Another source of error which can result in the disconnection of a component being reversed is harboured by paper-based evaluation of a disconnection plan as a result of the overlooking of still active disconnection states, so that an individual component is incorrectly normalized, i.e. connected or switched on. Another risk of unwanted reversal of the disconnection results from a marker which has been attached to the component or to a switching point for this component in this regard having fallen off or being unrecognizable or having been inadvertently removed.

SUMMARY OF INVENTION

The present invention relates to providing a solution which allows the aforementioned drawbacks and risks to be avoided and an increase in occupational safety in a commercial installation, particularly a power plant, to be achieved.

In particular, the present invention relates to the use of a transponder, which has a reception element, a transmission element, a visual display unit and a memory element and also a control element which is operatively connected to these, in a commercial installation, particularly a power plant, in an arrangement or positioning on or in proximity to a component or at a switching or measuring point associated with said component for the purpose of visually displaying an operating state for the component or the switching or measuring point associated therewith using the visual display of the transponder.

In addition, the present invention relates to a method of the type denoted in more detail at the outset by virtue of a transponder, which has a reception element, a transmission element, a visual display unit and a memory element and also a control element which is operatively connected to these, being arranged on or in proximity to the component or at the switching or measuring point associated with said component, and the visual display unit of the transponder being used to visually display an operating state for the component or the switching or measuring point associated therewith on said visual display unit.

Furthermore, the present invention relates to a commercial installation, particularly a power plant, by virtue of it being equipped with a transponder which is used according to The present invention allows the work and measures required for repairing and/or maintaining a component, for example, to be accompanied in computer-aided fashion up to the relevant component. The information stored on the transponder, which information is variable, is furthermore rendered visually ascertainable, visible and readable to the human eye on the visual display unit. The visual display unit therefore dispenses with the need for attachment of adhesive labels, signs, markers or the like, which eliminates the involvement for attachment and removal and reduces time and costs. In addition, the invention avoids the risk of any erroneous measure during repair work and maintenance measures on a component and hence increases occupational safety. The use of the invention, such as for the process of disconnection, therefore provides not only technical/economic advantages but also an increase in the reliability during implementation and a substantial gain in occupational and production safety on account of explicit identification of a component, storage of component-specific information in the form of state/operational information units and visually ascertainable display of information contained in the state/operational information units directly on a relevant component.

Particularly advantageously, a transponder can be used when it is incorporated in a communication system and/or an information system. In one refinement, the invention is therefore distinguished by the use of a transponder for producing a communication system which comprises a read/write unit. A further refinement of the invention is characterized by the use of a transponder for producing an information system which comprises an electronic data processing (EDP) system.

Such a communication system and/or information system which comprises a transponder is appropriate and expedient particularly when it is employed and used for maintenance, servicing and/or repair work on the component and/or the commercial installation, for which reason the invention continues to provide for the use of a transponder in this connection.

In order to permanently associate the visual display unit with a component of a commercial installation, it is also expedient, in line with one refinement of the invention, if there is a fixed arrangement of the transponder on the component.

The visual display of an operating state of the component or of the switching or measuring point associate with said component by the display unit of the transponder, as provided for by the invention, can be employed particularly in connection with installation, servicing and/or repair work on the component and/or the commercial installation. To implement such use, one advantageous refinement of the invention provides for the memory unit to permanently store a transponder identification information unit and to be used to store at least one state/operational information unit which relates to a component associated with the transponder, wherein the transponder identification information unit and the at least one state/operational information unit are read from the memory element by means of the transmission element, and the at least one state/operational information unit is supplied to the memory element by means of the reception element, and wherein the transponder is designed such that at least one portion of the information contained in the state/operational informational units is displayed on the visual display unit.

In order to provide a person working on a component of an installation with the most specific and quickly ascertainable information possible regarding the operating state of the component, one refinement of the invention provides for the visual display unit to visually display or show only the number of state/operational information units, but not the state/operational information unit itself. As a result, during the process of disconnection, for example, it is possible to explicitly ascertain that when there are two active disconnections displayed on the visual display unit there must be no normalization, i.e. no reconnection, of the component, even if the disconnection step provides for this.

Expediently, one advantageous development of the invention provides for a warning signal to be shown on the visual display unit by means of the control element when the number of state/operational information units is greater than zero. This means that in the case of active disconnection a visually ascertainable warning message is output which may be a graphic, for example, in order to draw attention clearly to the disconnection.

In respect of use in commercial installations, particularly power plants, it is of particular advantage if the state/operational information units which can be stored in the memory element each comprise a piece of information regarding a connection or disconnection state of the component and/or recently performed servicing on the component and/or a recently performed official examination of the component and/or recently performed measured value recording for the component, which is likewise provided by the invention.

In one particularly preferred embodiment of the present invention, the visual display unit is a display based on electronic ink with bistable display elements. These are chemically microcapsules which contain two different colour components of different charge which orient themselves in the electrical field. On the basis of the particle sizes and the viscosity of the system, there is no immediate relaxation back to a disorderly initial state when the electrical field has been switched off, and hence no loss of the information written on the display unit, but rather there may merely be a decrease in contrast. This ensures that information is displayed on the display unit, even when the transponder is in a zero-voltage state. Furthermore, no power source is required in order to operate the visual display unit. As examples of electronic ink, reference may be made to the products from the companies Gyricon and E-Ink Cooperation. These products of electrophoretic display units are microcapsules which contain charged dye particles. The individual particles are colourless, however, and smaller than in the case of other electronic inks. These electrophoretic display units are flexible, insensitive to shock and stable under pressure. In addition, the comparatively low actuation voltage limits the circuit complexity for the supply of power.

Alternatively, other display technologies can also be used for the display unit, however, reference being made in this case to the known technologies FLCD (Ferroeletric Liquid Crystal Display), EASL (Electrically Addressable Smetic Liquid Display), ZBD (Zenithal Bistable Devices), CHLCD (Cholesteric Liquid Crystal Display) and OLED (Organic Light Emitting Diode), which are described in more detail in the document WO 2006/012997.

The information displayed on the display unit may comprise at least one alphanumeric character and/or at least one graphic. By way of example, the display of alphanumeric characters allows specific information to be read off, whereas a graphic can be used to increase attention.

The transponder may be a passive transponder which draws its requisite power from a transmitted signal, which is sent by a read/write unit which is compatible with the transponder, for example. This allows the transponder to obtain and draw its power required for operation solely from such a read/write unit. In comparison with an active transponder, this has the advantage that no power source, such as a battery, is required for the operation of the transponder.

In particular, in line with a further refinement of the invention, the transponder is an RFID transponder. In this context, the abbreviation RFID stands for Radio Frequency Identification and means identification using electromagnetic waves. By way of example, the transponder may be an RFID transponder which has an operating frequency of 13.56 MHz, this allowing contactless identification and localization of the transponder using electromagnetic waves. As a result, it is also possible for data to be read in and out on the transponder contactlessly, the transmission and reception source needing to be brought to within approximately 3 cm, preferably 2 cm to 6 cm, of the transponder. The short distance is therefore of particular importance, since, by way of example, a plurality of transponders associated with corresponding components in a commercial installation may be arranged close together on a control panel and only a defined interval between the transmission and reception sources and the transponder allows explicit identification of the transponder.

In one refinement of the inventive use of the transponder in a communication system, the read/write unit stores at least one state/operational information unit and at least one identification information unit, wherein each identification information unit has at least one associated state/operational information unit, the read/write unit can read a transponder identification information unit from the memory element of the transponder, and the read/write unit takes the read transponder identification information unit as a basis for transmitting at least one state/operational information unit from the read/write unit to the transponder.

In this case, it is then also expedient if the content of the at least one state/operational information unit which is stored in the read/write unit can be altered by a user of the read/write unit before the transmission to the transponder. This is expedient particularly in the case of reconnection, since the user first of all normalizes the component, i.e. reconnects it, and then confirms this on the read/write unit, so that the status of the relevant state/operational information unit can be updated.

So that the user of the read/write unit can see that he is actually performing the measure on the correct component, the invention also provides for the read/write unit to be designed to compare the transponder identification information unit read from the transponder with the at least one identification information unit stored in the read/write unit.

In a further refinement of the use of the transponder in connection with the communication system, the invention provides that if the content of the transponder identification information unit and of an identification information unit matches then the read/write unit reads state/operational information units stored in the transponder and/or transmits at least one state/operational information unit which is associated with the identification information unit and which is stored in the read/write unit from the read/write unit to the transponder. As a result, during the process of disconnection, for example, the read/write unit can be used to establish whether further disconnection steps which are stored on the transponder in the form of the state/operational information units are active for the relevant component, the disconnection step to be performed by the user also being able to be added on the transponder to the list of disconnection steps stored thereon in the form of a state/operational information unit.

Following the normalization or reconnection of an initially disconnected component, it is necessary for the relevant disconnection step stored on the transponder to be removed from the memory element of the transponder. To this end, one refinement of the invention provides that if the content of the transponder identification information unit and of an identification information unit matches then the read/write unit sends a control signal to the transponder, which control signal prompts the control element to erase a state/operational information unit stored in the memory element When there are a plurality of disconnection steps stored on the transponder, provision may be made for the read/write unit to output a warning message when the number of state/operational information units read from the transponder is greater than zero. This refers the user of the read/write unit specifically to a possible conflict between disconnection steps or disconnection states.

The read/write unit may be a mobile portable computer in the form of a handheld PDA (Personal Digital Assistant) or a laptop. Alternatively, the read/write unit may also be in the form of a mobile telephone which has the same functionality as a PDA or laptop. This has the advantage that the user can conveniently carry the read/write unit with him and use it at different locations in the commercial installation. The memory power of today's mobile computers allows an extensive collection of information for the widest variety of components and work which needs to be performed. The use of such a mobile computer significantly increases convenience for the user and occupational safety. In this case, the integration of a reading device for transponders into a mobile computer of this kind is widely known today and therefore easy and inexpensive to implement.

In one refinement of the inventive use of the transponder in an information system, at least one of the state/operational information units stored in a read/write unit is read from the read/write unit by the central EDP system, and state/operational information units to be stored in the read/write unit are transmitted from the central EDP system to the read/write unit.

In this context, it is then also expedient for the central EDP system to be designed to process state/operational information units read by the read/write unit, particularly to compare them with state/operational information units stored in the EDP system. In this case, both the state/operational information units stored in the EDP system and the state/operational information units stored in the read/write unit are subjected to data alignment or to a bidirectional synchronization operation. This ensures that the EDP system always has the most up-to-date information about the components in the installation, so that the EDP system can produce disconnection lists either in preparation for planned measures or else ad hoc in the case of a fault in the installation.

In this context, provision may be made for the visual display unit to display only the number of state/operational information units but not the state/operational information unit itself. This provides a person with the most specific and quickly ascertainable information possible regarding the operating state of a component. As a result, during the process of disconnection, for example, it is possible to explicitly ascertain that when there are two active disconnections displayed on the visual display unit, the component must not be normalized, i.e. reconnected, even if the disconnection step provides for this. In addition, the person is compelled to use a read/write unit if he needs to access all the information stored in the transponder.

When the method is implemented, the control element can be used to show a warning signal on the visual display unit if the number of state/operational information units is greater than zero. As a result, a visually ascertainable warning message, which may be a graphic, for example, is output in the case of active disconnection, for example, in order to draw attention clearly to the disconnection.

Provision may also be made for a read/write unit to transmit the state/operational information unit which is received by means of the reception element and which is stored in the memory element in the form of a signal and for the read/write unit to be brought into the frequency-dependent reception/transmission range of the transponder, preferably to within to 3 to 6 cm of the transponder, in order to transmit the signal. This allows explicit identification of the transponder and contactless reading-in and reading-out of data stored on the transponder.

In addition, provision is expediently made for the transponder identification information unit permanently stored in the transponder to be read therefrom by the read/write unit before the signal is transmitted and for the transponder identification information unit to be compared with an identification information unit stored in the read/write unit. This ensures that the state/operational information unit to be transmitted to the transponder is also transmitted to the correct transponder.

In this case, if the transponder identification information unit and the identification information unit match, the read/write unit can read state/operational information units stored in the transponder, and a warning message can be output by the read/write unit if the number of read state/operational information units is greater than zero. In the case of active disconnection, for example, this displays a perceptible and possibly visually ascertainable warning message to the user in order to increase the user's attention to the detected conflict.

If the transponder identification information unit and the identification information unit match, a state/operational information unit which is stored in the read/write unit and which is associated with the identification information unit can be subjected to a processing step in which the status of this state/operational information unit is changed before a signal containing the changed state/operational information unit is transmitted to the transponder. This is necessary particularly in the case of reconnection, since the user first of all normalizes the component, i.e. reconnects it, and then confirms this on the read/write unit, so that the status of the relevant state/operational information unit can be updated.

Following the normalization, i.e. connection, of a component, it is necessary for the relevant disconnection step stored on the transponder to be removed from the memory element of the transponder. To this end, if the transponder identification information unit and the identification information unit match, the read/write unit sends a control signal to the transponder, as a result of which a state/operational information unit stored in the memory element is erased by the control unit.

Expediently, the storage of the transmitted state/operational information unit is followed by the visual display visually displaying only the current number of state/operational information units stored in the transponder but not the state/operational information unit itself. During the process of disconnection, for example, this means that it is possible to explicitly indicate that when there are two active disconnections displayed on the visual display unit there must be no normalization, i.e. no reconnection, of the component, even if the disconnection step currently being handled provides for this.

So that it is actually possible for state/operational information units and hence information to be transmitted to the transponder, at least one state/operational information unit is transmitted to the read/write unit by a central EDP system before the signal is transmitted to the transponder.

Following the transmission of the signal to the transponder, the changed state/operational information unit which is stored in the read/write unit can be read by the central EDP system. This implements central data and information management via the operating state of the individual components.

Finally, as already illustrated above at least in part, one refinement of the method also characterizes the invention in that use of the transponder is implemented in accordance with one of Claims 2 to 15.

The features which are cited above and which will be explained below can be used not only in the respectively indicated combination but also in other combinations. The framework of the invention is defined only by the claims.

BRIEF DESCRIPTION OF FIGURES

The present invention is explained in more detail below using exemplary embodiments with reference to the associated drawings, in which:

FIG. 1 shows a schematic illustration of an information system, comprising a transponder, a read/write unit and an EDP system according to an exemplary embodiment of the present invention.

DETAILED DESCRIPTION

Figure 4:
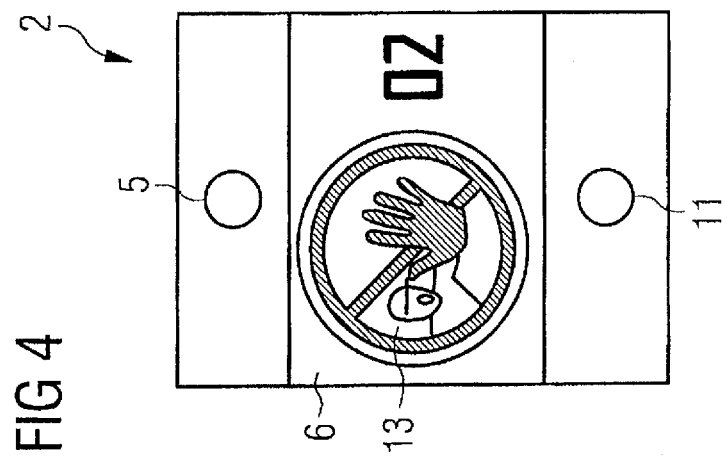
FIG. 4 shows an illustration of a transponder whose visual display unit displays two disconnections of a component according an exemplary embodiment of the present invention.

FIG. 1 schematically shows an information system, denoted overall by reference numeral 1, which comprises a transponder 2, a mobile read/write unit 3 and an EDP system 4. The proportions shown in the illustration between the transponder 2, the mobile read/write unit 3 and the EDP system 4 do not necessarily correspond to the actual relationships.

The transponder 2 has an opening 5 which is in the form of a hole and through which it is possible to put a mounting element in order to allow the transponder 2 to be permanently fitted to a component of a commercial installation. Besides mechanical mounting options provided by the opening 5, the transponder 2 can also have a lateral face, which is remote from a visual display unit 6 of the transponder 2, fitted on and/or to the component of the installation by means of an adhesive or the like. In particular, the transponder is intended to be used in connection with a commercial power plant.

The transponder 2, which is in the form of thin small plate (the small plate may be in rigid or supple form), also has a reception element 7, a transmission element 8 and a control element 9. The control element 9 is connected to the reception element 7, to the transmission element 8 and to the visual display unit 6 and comprises a memory element 10. The memory element 10 permanently stores a unique identifier, produced during the manufacture of the transponder 2, in the form of a transponder identification information unit, which may be a number. Besides the transponder identification information unit, the memory element 10 can be used to store a plurality of state/operational information units which relate to a component associated with the transponder 2. In this case, each state/operational information unit comprises information associated with the relevant component, such as its component name (pump unit), the position thereof within the commercial installation, a short description in the form of an operating instruction, technical data and the like. This information is also referred to as master data for the component. Furthermore, the respective state/operational information unit may contain a piece of information about a measure to be performed on the component and/or comprise a piece of information regarding a connection or disconnection state of the component and/or recently performed servicing on the component and/or a recently performed official examination of the component and/or recently performed measured value recording for the component.

The transponder identification information unit and the state/operational information units are read from the memory element 10 by an appliance which is compatible with the transponder 2 using the transmission element 8. In addition, state/operational information units are supplied to the memory element 10 via the reception element 7.

Figure 3:
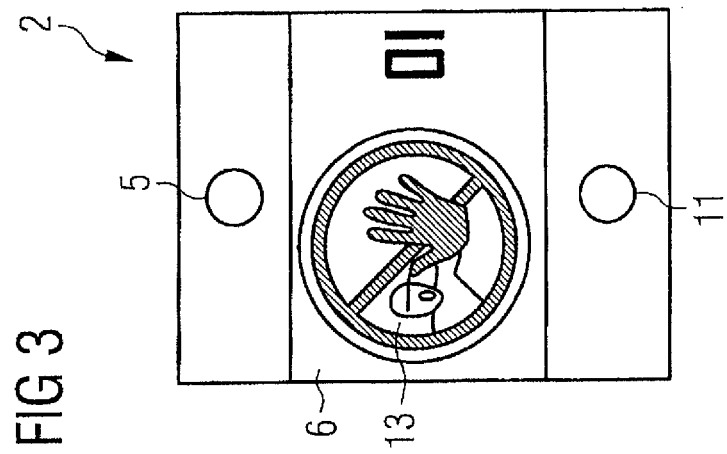
FIG. 3 shows an illustration of a transponder whose visual display unit displays a disconnection of a component according an exemplary embodiment of the present invention.

The visual display unit 6 of the transponder 2 is a display based on electronic ink with bistable display elements, the information displayed thereon or the displayed information comprising alphanumeric characters and a graphic, as can be seen in FIG. 3. The visual display unit 6 therefore visually displays a portion of the information contained in the state/operational information units. Alternatively, the visual display unit 2 may be designed on the basis of a different technology from that of electronic ink. The transponder 2 illustrated in this embodiment also has a recess 11.

A communication operation between the transponder 2 and a compatible appliance in the form of a read/write unit 3 starts when a read/write pen on this appliance is brought to within 3 cm of the transponder 2. In this case, the recess 11 serves merely as an aid to putting on the read/write pen, so that communication between the transponder 2 and the compatible appliance 3 is ensured.

Alternatively, the recess can also be used in the case of capacitive coupling between the transponder 2 and the compatible appliance for the purpose of supplying electrical power from the electrical field of the compatible appliance by means of electrodes in the circuit of the transponder 2.

The aforementioned elements of the transponder 2 are the basic elements for this operation and should not be understood as conclusive. Optionally, the transponder 2 may additionally have a microprocessor, which means that the transponder 2 is programmable and can evaluate and process received state/operational information units. The transponder 2 used in this exemplary embodiment is a passive transponder which draws its required power from a transmitted signal. Alternatively, an active transponder can also be used, however, but this requires a separate power source (e.g. a battery or a solar cell) for operation. For a further alternative, the transponder 2 may also be an RFID transponder which has an operating frequency of 13.56 MHz, which allows contactless identification and localization of the transponder using electromagnetic waves.

A wide variety of read/write units 3 which are in the form of mobile portable computers in the form of handheld PDAs or laptops are suitable as an appliance which is compatible with the transponder 2. These appliances are generally compatible with a transponder 2, as described here, on account of their standardization. The read/write unit 3 in the form of a mobile computer has a display apparatus 12 for visually displaying information or for displaying the state/operational information units and is carried by a user when measures need to be performed on components of a commercial installation. A computer program which can be executed on the read/write unit 3 can be used to manage state/operational information units stored on the read/write unit 3 and the status of said state/operational information units can be altered by the user of the read/write unit 3.

The transponder 2 and the read/write unit 3 interchange information as indicated by the arrows in FIG. 1, so that both form a communication system. For the purpose of information interchange with the transponder 2, at least one state/operational information unit and at least one identification information unit identifying and/or verifying the transponder 2 are stored in the read/write unit 3, each identification information unit having at least one associated state/operational information unit for a component. For the purpose of information interchange or communication with the transponder 2, the read/write unit 3 reads the transponder identification information unit from the memory element 10 of the transponder 2. If the transponder identification information unit and the identification information unit match, the read/write unit 3 transmits the state/operational information unit associated with the identification information unit to the transponder 2.

The term "information/operational information unit" used above comprises information regarding an active or activatable connection or disconnection state of an associated component. The term "transponder identification information unit" comprises a transponder identification "feature", preferably in the form of an alphanumeric or binary combination, which is stored on the transponder and which explicitly identifies the transponder.

The term "identification information unit" comprises such a transponder identification "feature" stored on the read/write unit 3.

Before transmission to the transponder 2, a user can alter the content of the state/operational information unit stored in the read/write unit 3, so that the transponder 2 receives an updated state/operational information unit. In this case, the update relates to a measure which is performed on the component and which, by way of example, may be disconnection or reconnection. In addition, the read/write unit 3 also reads the state/operational information units stored in the transponder if there is a match between the content of the transponder identification information unit and the identification information unit. In the case of a disconnection operation, it is possible for the number of state/operational information units read to be greater than zero, which means that there are multiple disconnections for the present component. In this case, the user of the read/write device 3 receives a warning message which draws his attention to this conflict and informs him that the component must not be reconnected under any circumstances.

In addition, the read/write unit 3 in this case sends a control signal to the transponder 2 which prompts the control element 9 to erase the state/operational information unit, stored in the memory element 10, which is associated with the identification information unit.

So that the read/write unit 3 actually holds state/operational information units which need to be transmitted to the transponder 2, appropriate state/operational information units are transmitted from the central EDP system 4 to the read/write unit 3 in advance of the measure which is to be performed on a component and the associated information interchange between the transponder 2 and the read/write unit 3. Within the central EDP system 4, the circuit diagram for the commercial installation is stored in a database which is managed by a computer program. In the database of the system, the disconnection location of the component is linked to the explicit identification information unit of the transponder 2. In the case of a process of disconnection, for example, the central EDP system 4 undertakes the planning of disconnection operations for individual components and also entire procedural systems by creating disconnection lists with individual disconnection steps. The disconnection steps correspond to the state/operational information units which are transmitted to the read/write unit 3 after the planning and creation of the disconnection list. When the list has been processed, the state/operational information units stored in the read/write unit are read and processed by the central EDP system 4, with the read state/operational information units being compared with state/operational information units which are stored in the EDP system 4. In this context, measures which are not performed are recognized by the EDP system 4 and are incorporated into an appropriate list for fresh performance and processed at a later time.

The text below describes an example of the equipment of a component of a power plant in a commercial installation and also an exemplary disconnection and connection process, in which the transponder 2, the communication system comprising the transponder 2 and the read/write unit 3, and the information system 1 comprising the transponder 2, the read/write unit 3 and the central EDP system 4 are used. Such a disconnection and connection process is performed in power plants in the course of servicing, maintenance and/or repair work. The "disconnection" is used to switch off the components or units and render them "safe", so that it is possible to work on them or on downstream or associated components without risk. Following the conclusion of the work, the components are connected or switched on again. This operation is called normalization.

Figure 2:
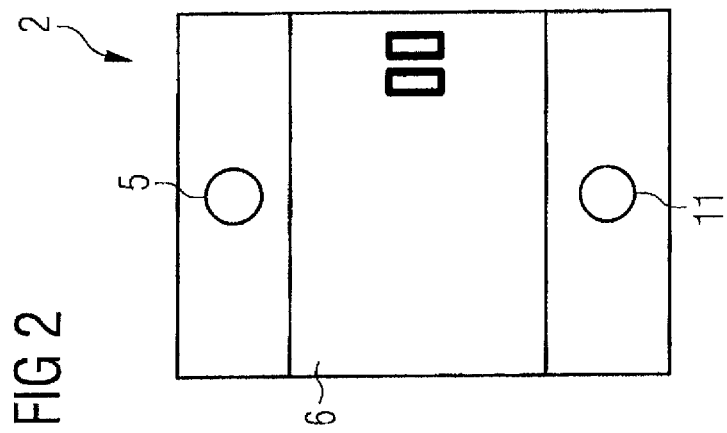
FIG. 2 shows an illustration of a transponder after it has been initialized according an exemplary embodiment of the present invention.

Prior to the use of the information system 1 in a commercial installation, such as a power plant, in particular, a preparatory measure involves all the components of the commercial installation which possibly need to be operated in the course of a disconnection being permanently fitted with a respective transponder 2 having a visual display 5. The mobile read/write unit 3 on which an EDP application for assisting the method of disconnection is performed is used to read a transponder identification information unit from the transponder 2 and to associate this explicit and invariable identification identifier with other information from this component, such as a component name (pump unit), a location name in the installation, a short description in the form of an operating instruction, technical data and the like, which are also called master data. This preparatory measure also involves initialization of the data management on the transponder 2, in which a list of state/operational information is erased. The state/operational information units respectively contain an identification information unit, which is a number, for example and a piece of information which indicates a connection or disconnection state of the component, for example. Furthermore, the state/operational information units can also contain the master data for the relevant component. The conclusion of initialization is shown readably by the transponder 2 by displaying the digits "00" on the visual display unit 5, as shown in FIG. 2. The digits "00" indicate to the personnel in the commercial installation that this component is connected, i.e. that there is no disconnection of the component.

Following the conclusion of the preparatory measure and hence of the association of the respective transponder identification information units with the relevant components, the respective information units are transmitted from the mobile read/write unit 3 to the central EDP system 4 and are stored thereon.

As the result of the preparatory measure, the central EDP system 4 creates an installation plan in which each component has an associated explicit identification information unit and/or an associated transponder identification information unit.

A disconnection process which is to be performed for a component can be rough divided into three sections. In a first step, what is known as a disconnection plan is created, followed in a second step by the performance of the disconnection, which is then followed in a concluding third step by the reconnection or normalization. For the disconnection which is to be performed for a component of the commercial installation, in the exemplary embodiment of a power plant, the EDP system 4 is used to produce a disconnection plan and/or a disconnection list with one or more disconnection steps, each individual disconnection step having an associated explicit identification information unit and transponder identification information unit. Each individual disconnection step is produced as a state/operational information unit in the EDP system 4 and incorporated into the disconnection list.

To assist the process of disconnection, the disconnection list with the state/operational information units which are produced in the EDP system 4 and which respectively contain the identification information unit, the master data for a component which are associated with the identification information unit and the measure which is to be performed on the component, is transmitted to at least one mobile read/write unit 3. In this case, a possible split in the disconnection list can be made according to different aspects. It is usual to separate mechanical and electrical disconnection, because these two measures require people with different qualifications and can usually also only be performed by these people.

The display 12 of the mobile read/write unit 3 is used to display the disconnection list with all the disconnection steps which are to be performed which are associated with one person. Suitable means, for example a colour envelope or a symbol, are used to identify already performed disconnection steps on the display 12 of the read/write unit 3. Furthermore, the display 12 is used to display the master data for a respective component or can be used to show them by means of user interaction. An online connection between the mobile read/write unit 3 and the central EDP system 4 is not required, but can be set up optionally, for example by means of WLAN. Since reception cannot be safeguarded everywhere in commercial installations, however, autarkic operation (without an online connection) of the mobile read/write unit 3 is provided primarily.

Upon reaching a component of the commercial installation which needs to be disconnected, the user holds the read/write unit 3 close to the transponder 2 which is attached to the component or in proximity thereto or else to a switching point therefor. As a result of comparison of the transponder identification information unit read from the transponder 2 with the identification information units stored in the disconnection list, which each have a corresponding associated disconnection step, the correct disconnection step is automatically shown or, in the event of an error, a message is displayed if this component is not associated with a disconnection step.

When the user of the read/write unit 3 has in this way satisfied himself that he is at the correct component, he disconnects it. The component can be disconnected by pushing a switch or rotating a crank, for example. The performance of the disconnection measure is confirmed by the user by operating a button on the mobile read/write unit 3. Next, the read/write unit 3 is brought close to the transponder 2 of the component, so that the read/write unit 3 transmits a state/operational information unit (for example the identification number of the disconnection plan which is currently to be executed or initialized) to the transponder 2 and stores the state/operational information unit possibly in a convenient list of the disconnection plan numbers which are stored in the transponder 2. The transponder 2 stores this state/operational information unit permanently in its memory element 10. In response to the data transmission, the transponder 2 also uses the visual display unit 5 to show a conspicuous symbol 13 and displays the number of simultaneously active disconnection operations as a number. Accordingly, one active disconnection operation is displayed in FIG. 3, whereas in FIG. 4 two active switching operations are displayed. This information is therefore visually accessible to everyone and no read/write unit 3 is required for this. The disconnection plan numbers will usually not be shown on the display, which means that this list can still be read only using the read/write unit 3.

Following the conclusion of the disconnection operations, the confirmations are transmitted from the mobile read/write unit 3 to the central EDP system 4. Complete processing of the disconnection list stored on the read/write unit 3 is desirable, but not necessary. The central EDP system 4 performs the confirmation of the disconnection steps from a plurality of mobile read/write units 3 and shows the combined status of the disconnection operations. Disconnection steps which have not yet taken place are therefore reliably recognized and can be reassigned to a mobile read/write unit 3. Only when the central EDP system 4 reports that all the disconnection steps of a disconnection plan have been performed is it possible to grant a work approval for the component.

As soon as the work associated with a disconnection plan is reported to have ended, the disconnection plan can be selected in the EDP system 4 for normalization and can be transmitted in the same way as for the disconnection to one or more mobile read/write units 3.

When the component to be normalized is reached, the read/write unit 3 is brought close to the transponder 2 which is attached to the component. During this operation, the mobile read/write unit 3 reads the transponder identification information unit from the memory element 10 of the transponder 2 and the list of disconnection plan numbers which are stored on the transponder 2 in the form of state/operational information units. By comparing the read transponder identification information unit with the identification information units stored for the disconnection steps, the correct disconnection step is sought and displayed using an EDP application installed on the read/write unit 3. In the event of an error, i.e. if this component is not associated with any disconnection step, a message is displayed on the display 12 of the read/write unit 3. In the next step, the application on the mobile read/write unit 3 checks whether the list of disconnection plan numbers contains exclusively the number of the disconnection plan which is to be normalized. Should this not be the case, a conspicuous message 13 is displayed on the display 12 which provides information that other disconnections are still active and normalization must not take place.

When it has been ascertained that the correct component is involved and the normalization can also be performed, the component is put back into the normal state, i.e. it is connected by pushing a switch or rotating a crank, for example. The performance of the measure is confirmed by operating a button on the mobile read/write unit 3 and then holding the read/write unit 3 against the transponder 2 of the component. During this operation, the read/write unit 3 erases the relevant state/operational information unit which is stored in the memory element 10. The transponder 2 stores this information permanently in its memory element 10. In response to the data transmission, the transponder 2 updates the visual display unit 6. The conspicuous symbol 13 continues to be displayed if further disconnections are active, otherwise it disappears. The number of simultaneously active disconnection operations is updated as a number and as a result provides the user with a visual report. The current state of the disconnections therefor continues to be visually accessible to everyone. A read/write appliance 3 is not required for this purpose in order to identify the number of active disconnection states which is shown in FIGS. 3 and 4.

Following the conclusion of the normalization operations, the confirmations are transmitted from the mobile read/write unit 3 to the central EDP system 4. In a similar manner to the practice with a disconnection, the EDP system 4 tracks the normalization operations performed and signals which normalization operations are still outstanding and/or for which disconnection operations the normalization has been completed.

The invention can be used not only for a disconnection process for components of a commercial installation, such as a power plant, as described above, however, but can also be used for other visually displayable measures, which ensures an increase in the reliability of implementation and a substantial gain in occupational and production safety. In this context, the transponder 2 is in turn fitted to the component itself or at a location suitable for the measure.

Figure 5:
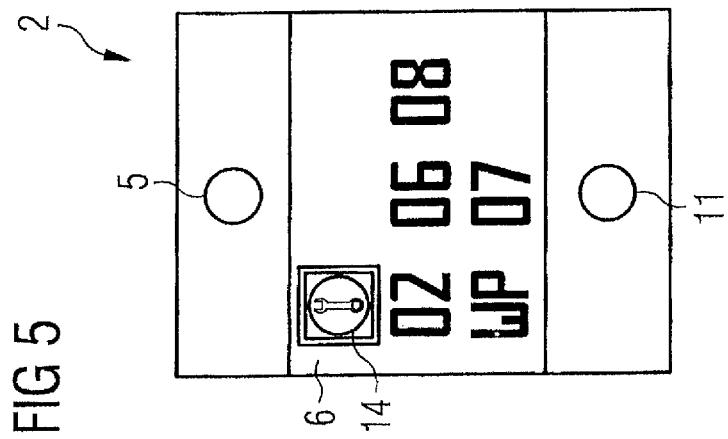
FIG. 5 shows an illustration of a transponder whose visual display unit displays a time for a recently performed servicing measure according an exemplary embodiment of the present invention.

In FIG. 5, the visual display unit 6 of the transponder 2 displays recently performed servicing for a component of a commercial installation. In this case, the visual display 6 is used to show a symbol 14 which represents a servicing measure. The other information shown in the visual display 6 shows the date of the recently performed servicing measure. In equivalent fashion to the process of disconnection, the central EDP system 4 creates and processes a servicing plan. When it has been processed, said servicing plan is stored on the read/write unit 3, which involves the relevant state/operational information unit being changed by the user of the read/write unit 3. Following conclusion of the servicing work, this changed state/operational information unit is transmitted to the transponder 2, which then updates the date shown for the recently performed servicing. As further information, FIG. 5 shows the relevant servicing plan "WP 07" on the visual display unit 6, since the servicing of a component or machine in a commercial installation has several associated servicing plans. In the case shown, servicing according to servicing plan "WP 07" was accordingly recently performed on Feb. 6, 2008.

Figure 7:
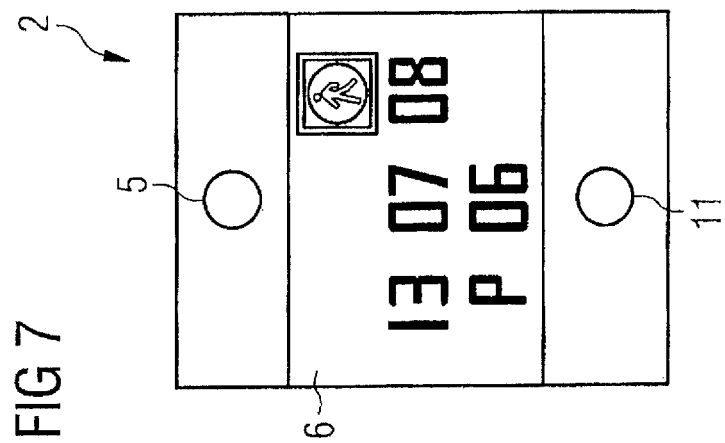
FIG. 7 shows an illustration of a transponder whose visual display unit displays a time for recently performed test certification according an exemplary embodiment of the present invention.
Figure 6:
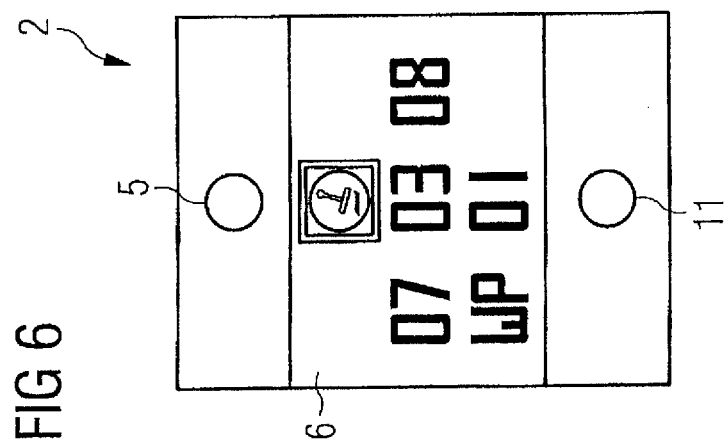
FIG. 6 shows an illustration of a transponder whose visual display unit displays a time for a recently performed acceptance examination according an exemplary embodiment of the present invention.

In FIG. 6, the visual display unit 6 of the transponder 2 shows a recently performed official examination (Technical Control Board) for the component whereas FIG. 7 displays recently performed measured value recording for the component. A change to the information shown in FIG. 6 and FIG. 7 is made in identical fashion to the previously described measure of recently performed servicing, so that reference is made to the above explanations in this regard.

The invention claimed is:

1. Use of a transponder (2) during a disconnection process which is performed in the course of maintenance, serving and/or repair work on a component and/or a commercial installation, wherein the disconnection process comprises the steps of creating a disconnection plan, of performing the disconnection and of reconnection or normalization, and wherein the transponder (2) has a reception element (7), a transmission element (8), a visual display unit (6) and a memory unit (10) for storing at least one state/operational information unit and also a control element (9) which is operatively connected to these, in a commercial installation in an arrangement or positioning on or in proximity to the component or at a switching or measuring point associated with said component for the purpose of visually displaying an operating state for the component or the switching or measuring point associated therewith using the visual display unit (6) of the transponder (2), wherein the visual display unit (6) visually displays the number of stored state/operational information units and a warning signal is shown on the visual display unit (6) by means of the control element (9) when the number of stored state/operational information units is greater than zero.

2. Use of a transponder (2) according to claim 1 for producing a communication system comprising a read/write unit (3).

3. Use of a transponder (2) according to claim 1 for producing an information system comprising an electronic data processing (EDP) system.

4. Use of a transponder (2) according to claim 1, characterized by a fixed arrangement for the transponder (2) on the component.

5. Use of a transponder (2) according to claim 1, characterized in that the memory element (10) permanently stores a transponder identification information unit and is used to store at least one state/operational information unit which relates to a component associated with the transponder (2), wherein the transponder identification information unit and the at least one state/operational information unit are read from the memory element (10) via the transmission element (8), and the at least one state/operational information unit is supplied to the memory element (10) via the reception element (7), and wherein the transponder (2) is designed such that at least one portion of the information contained in the state/operational information units is displayed on the visual display unit (6).

6. Use of a transponder (2) according to claim 1, characterized in that the visual display unit (6) not visually displays the state/operational information unit itself.

7. Use of a transponder (2) according to claim 1, characterized in that the state/operational information units which can be stored in the memory element (10) each comprise a piece of information regarding a connection or disconnection state of the component and/or recently performed servicing on the component and/or a recently performed official examination of the component and/or recently performed measured value recording for the component.

8. Use of a transponder (2) according to claim 1, characterized in that the visual display unit (6) is a display based on electronic ink with bistable display elements and/or the transponder (2) is an RFID transponder.

9. Use of a transponder (2) according to claim 2, characterized in that the read/write unit (3) stores at least one state/operational information unit and at least one identification information unit, wherein each identification information unit has at least one associated state/operational information unit, the read/write unit (3) can read a transponder identification information unit from the memory element (10) of the transponder (2), and the read/write unit (3) takes the read transponder identification information unit as a basis for transmitting at least one state/operational information unit from the read/write unit (3) to the transponder (2).

10. Use of a transponder (2) according to claim 9, characterized in that the content of at the least one state/operational information unit which is stored in the read/write unit (3) can be altered by a user of the read/write unit (3) prior to the transmission to the transponder (2) and/or in that the read/write unit (3) is designed to compare the transponder identification information unit read from the transponder (2) with the at least one identification information unit stored in the read/write unit (3).

11. Use of a transponder (2) according to claim 9, characterized in that if the content of the transponder identification information unit and of an identification information unit matches then the read/write unit (3) reads state/operational information units stored in the transponder (2) and/or transmits a state/operational information unit which is associated with at least the identification information unit and which is stored in the read/write unit (3) from the read/write unit (3) to the transponder (2) and/or in that if the content of the transponder identification information unit and of an identification information unit matches then the read/write unit (3) sends a control signal to the transponder (2), which control signal prompts the control element (9) to erase a state/operational information unit stored in the memory element (10).

12. Use of a transponder (2) according to claim 3, characterized in that at least one of the state/operational information units stored in a read/write unit (3) is read from the read/write unit (3) by the central EDP system (4), and state/operational information units which are to be stored in the read/write unit (3) are transmitted from the central EDP system (4) to the read/write unit (3).

13. Use of a transponder (2) according to claim 12, characterized in that the central EDP system (4) is designed to process state/operational information units read by the read/write unit (3), particularly to compare them with state/operational information units stored in the EDP system (4).

14. Method for performing maintenance, servicing and/or repair work on a component and/or on a switching or measuring point associated with said component in a commercial installation wherein a transponder (2), which has a reception element (7), a transmission element (8), a visual display unit (6) and a memory element (10) for storing at least one state/operational information unit and also a control element (9) which is operatively connected to these, is arranged on or in proximity to the component or at the switching or measuring point associated with said component during a disconnection process which is performed in the course of the maintenance, serving and/or repair work on the component and/or the commercial installation, wherein the disconnection process comprises the steps of creating a disconnection plan, of performing the disconnection and of reconnection or normalization, and wherein the visual display unit (6) of the transponder (2) is used to visually display an operating state for the component or the switching or measuring point associated therewith on said visual display unit, wherein the visual display unit (6) visually display the number of stored state/operation information units and a warning signal is shown on the visual display unit (6) by means of the control element (9) when the number of stored state/operational information units is greater than zero.

15. Method according to claim 14, characterized in that use of the transponder (2) according to claim 2 is performed.

16. Commercial installation characterized in that it is equipped with a transponder (2) used in accordance with claim 1.

17. Use of a transponder according to claim 1, wherein the commercial installation is a power plant.

18. Method according to claim 14, wherein the commercial installation is a power plant.

19. Commercial installation according to claim 16, wherein the commercial installation is a power plant.

\* \* \* \* \*